US006895369B2

(12) United States Patent
Becker

(10) Patent No.: US 6,895,369 B2
(45) Date of Patent: May 17, 2005

(54) METHOD FOR MONITORING AN AUTOMATION UNIT

(75) Inventor: Peter Becker, Gaggenau (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/809,678

(22) Filed: Mar. 26, 2004

(65) Prior Publication Data

US 2005/0027372 A1 Feb. 3, 2005

Related U.S. Application Data

(63) Continuation of application No. PCT/DE02/03650, filed on Sep. 26, 2002.

(30) Foreign Application Priority Data

Sep. 26, 2001 (DE) ........................................ 101 47 490

(51) Int. Cl.[7] ................................................ G06F 15/16

(52) U.S. Cl. .................................. 702/188; 340/825.07

(58) Field of Search ..................... 702/188; 340/825.07, 340/825.05, 825.06, 870.11, 870.16, 870.17, 340.8, 310.9, 825.08, 3.221; 370/85.1

(56) References Cited

U.S. PATENT DOCUMENTS 4,528,667 A * 7/1985 Fruhauf ...................... 714/809
5,128,855 A * 7/1992 Hilber et al. .................. 700/3
5,349,523 A * 9/1994 Inou et al. .................... 363/97
5,377,309 A * 12/1994 Sonobe et al. ................ 706/60
5,469,150 A 11/1995 Sitte
5,515,035 A * 5/1996 Gut ......................... 340/825.5
5,555,509 A * 9/1996 Dolan et al. ................ 700/276
5,691,714 A 11/1997 Mehnert et al.
5,765,000 A * 6/1998 Mitchell et al. ............ 710/266
6,016,523 A * 1/2000 Zimmerman et al. ......... 710/63
6,826,433 B1 * 11/2004 Barthel et al. ................ 700/79

FOREIGN PATENT DOCUMENTS

DE 32 40 046 A1 5/1983

OTHER PUBLICATIONS

Manfred Deppe, "Simatic and Profibus–DP—The Ideal Combination for Distributed Control", Engineering & Automation, vol. 18, No. 2, Mar. 1996, pp. 15–17, Berlin, Germany.

* cited by examiner

*Primary Examiner*—Carol S. W. Tsai
(74) *Attorney, Agent, or Firm*—Sughrue Mion, PLLC

(57) ABSTRACT

A method for monitoring an automation unit with a control unit (3) and several terminals (1,2), whereby the terminal can adopt at least two status values. At least some of the previous status changes can be subsequently reconstructed. The control unit (3) receives a message telegram from one of the terminals (1, 2), whereby the one terminal (1, 2) outputs another message telegram only after it has received an acknowledgment signal (Q) from the control unit (3). The message telegram contains at least one first transition component (E01), which indicates a transition from a first state value to a second state value of the at least two state values, and contains at least one second transition component (E10), which indicates a transition from the second state value to the first state value of the at least two state values.

5 Claims, 4 Drawing Sheets

*FIG. 1* RELATED ART

*FIG. 2* RELATED ART

*FIG. 3* RELATED ART

METHOD FOR MONITORING AN AUTOMATION UNIT

This is a Continuation of International Application PCT/DE02/03650, with an international filing date of Sep. 26, 2002, which was published under PCT Article 21(2) in German, and the disclosure of which is incorporated into this application by reference.

FIELD OF AND BACKGROUND OF THE INVENTION

This invention relates to a method of monitoring an automation system, having a control unit and a plurality of terminals. In particular, this invention relates to reliable detection of multiple signal changes in a message telegram between a terminal and a control unit in an automation system.

In automation systems having a plurality of terminals (also known as automation equipment) and control units (also known as operator control and monitoring stations or "operator stations"), events are represented in binary signals. Signal changes (level-triggered changes) are detected by the terminals and reported via message telegram to one or more control units, where the reported signal level is displayed and processed further.

Conventionally, a second message, e.g., with the content that the signal has changed again in the meantime, can be sent only after the control unit has confirmed, to the terminal, receipt of the first message. This confirmation is made with an acknowledgment message.

If a single signal is reported in a message telegram, then, conventionally, the last two signal changes are recognized. The boundary conditions for this are: a) an additional information "overflow" is provided in the message telegram, indicating that one or more signal changes could not be reported; b) a message having the same signal status as the signal that was reported last and stored in the control unit has been received.

To increase the efficiency of the signaling protocol and to more effectively utilize system resources, message telegrams containing more than a single signal are used, namely eight signals, for example. The additional information in the form of the "overflow flag" in the message telegram and the fact that a message telegram has been received constitutes a 1:n relationship for a plurality of signals. In this case, it is no longer possible to assign the extra information in the overflow flag and the event "reception of a message telegram" to an individual signal among the plurality of signals. Therefore, this allocation can no longer be used for the generally valid signal tracking. The available information in the message telegram is instead reduced to the particular signal status. An interim change from the original state to a second state and back again is not recognized.

OBJECTS OF THE INVENTION

One object of the present invention is to provide a method with which at least some of the preceding state changes can be reconstructed even after the fact.

SUMMARY OF THE INVENTION

This and other objects are achieved, according to one formulation, by a method of monitoring an automation system, in which at least one terminal, which is configured to assume at least two state values, outputs a message telegram in accordance with the at least two state values; a control unit enters the message telegram from the at least one terminal; and the at least one terminal outputs another message telegram only after the one terminal has received an acknowledgment signal from the control unit. The message telegram contains at least one first transition component, which indicates a transition from a first state value to a second state value of the at least two state values, and contains at least one second transition component, which indicates a transition from the second state value to the first state value of the at least two state values.

According to this invention, the message telegram is expanded in order to notify the control unit, if necessary, that another transition has taken place in addition to the transitions that can be deduced from the message telegram. To do so, one or two other binary information bits are provided per signal. When the message telegram additionally transmits the current status of the terminal, then it is possible to deduce additional transitions on the basis of a comparison of the previous state with the current state of the terminal and/or to perform a plausibility check of the information transmitted via the message telegram.

According to one formulation, the inventive method for monitoring an automation system provides for having at least one terminal that can assume at least two state values and that outputs a message telegram in accordance with the at least two state values, and for having a control unit which receives the message telegram from the at least one terminal. The at least one terminal outputs another message telegram only after it has received an acknowledgment signal (Q) from the control unit. The message telegram includes at least one first transition component (E01), which indicates a transition from the first state value to a second state value of the at least two state values, and has at least one second transition component (E10), which indicates a transition from the second state value to the first state value of the at least two state values.

Preferably the message telegram has at least one state component which displays a current state value of the at least two state values of the terminal, the control unit compares the current state value of the terminal with a previous state value of the same terminal and, depending on the results of the comparison and the first and/or second transition component, state transitions of the respective terminal are determined before the current state value is reached.

In another preferred embodiment of this invention, at least one concomitant value information component is provided for a concomitant value information in the message telegram, establishing a correlation between at least one of the transition components and the concomitant value information.

Preferably all the components of the at least one message telegram are in binary form.

One advantage of this invention is that the control unit can simulate the signal progression of the last two signal changes on the basis of the received signal state S1 and the event information E01 and E10.

BRIEF DESCRIPTION OF THE DRAWINGS

Additional features and advantages of this invention are derived from the following description of an exemplary embodiment, in which reference is made to the accompanying drawings.

DETAILED DESCRIPTION OF THE PREFERRED EMBODIMENTS

Figure 1:
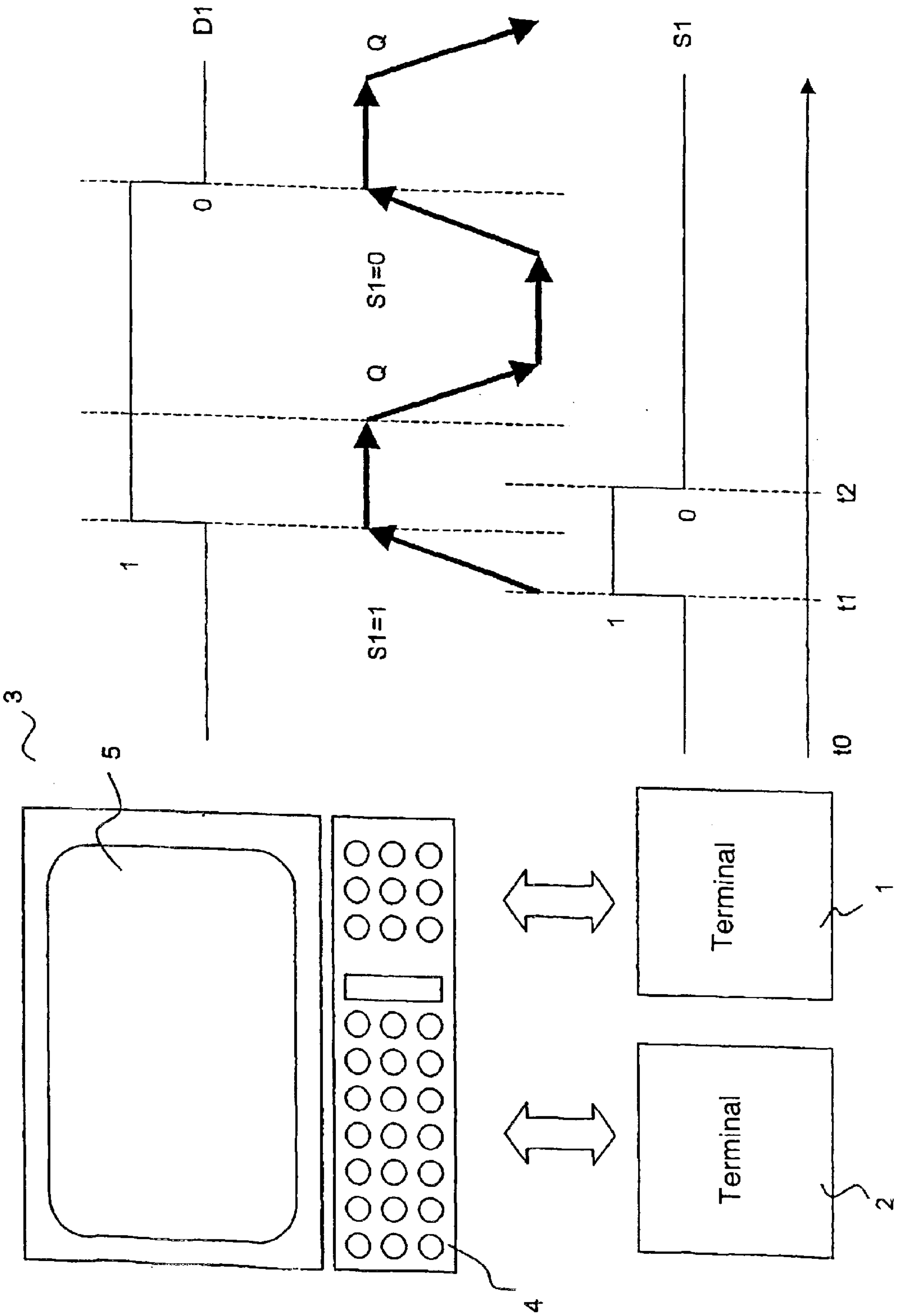
FIG. 1 shows this sequence of the change in state and the respective diagram for one state transition, according to the state of the art.

FIG. 1 shows an automation system having two terminals 1 and 2 and a control unit 3. The control unit includes an input keyboard 4 and a display screen for displaying signals and state information of the terminals 1, 2 with which the control unit 3 is connected and, depending on the scope of the automation system, of additional terminals (not shown).

Each of the terminals 1 and 2, which ordinarily fulfill specific tasks in the automation system, may assume at least two different state values. These state values are sent as state information or as information about a transition between state values to the control unit 3. Communication between the terminal 1 and/or 2 and the control unit 3 is indicated with double arrows in the figure. The control unit 3 enters the various asynchronous messages of the individual terminals, so that the personnel responsible for monitoring the system has an overview of the overall status of the system and may, if necessary, intervene via the control unit 3 for the purpose of regulating the system (here and below the terms "enter" or "input" are understood to refer to the detection, receipt and/or processing of messages of the terminals in the control unit without these messages having to be first called up at the respective terminal, although that is also possible).

The control unit should always display the current status of the terminal—with a time lag—and should also at least recognize the last transition cycle of the terminal ("0"→"1"; "1"→"0" or "1"→"0"; "0"→"1"). In certain application cases, the second aspect has a particular significance: in state messages (so-called "events") it is important to ascertain whether or not an event has taken place, e.g., whether a valve in the system has been opened and closed again. How often this happens is of subordinate importance and is determined in the terminal, if necessary, and then is available as additional information.

The right part of FIG. 1 shows the sequence of multiple state changes in the terminal 1, the content of messages exchanged between the terminal 1 and the control unit 3, and the respective representation in the control unit 3, according to the state of the art.

At a point in time t0, the terminal is in a logic state designated as "0." This state value may exist at the start of operation of the automation system, for example, or it may be reached at a subsequent point in time. In the first case, the state value of the terminal 1 is not known directly to the control unit 3 and the original state value is recognized only by signaling a change in the state of the terminal 1 to the control unit 3.

At a point in time t1, there is a transition of the terminal 1 from a logic state value "0" to a logic state value "1." This transition triggers the function of a message telegram by the terminal 1. The message telegram includes a state component S1 which is an identical image of the state value of the terminal 1. (For the sake of simplicity, a system in which a signal may assume only two state values is assumed here, but the invention is not limited to that and the state component S1 may in general assume multiple state values.) The message telegram is input by the control unit 3. The input takes place over a certain period of time, indicated in FIG. 1 by an oblique arrow from a lower level to an upper level. In addition to the arrow, the content of the message telegram is indicated; in this case it consists only of the state component S1, whose content is "1," i.e., it is the new state value, representing the state which the terminal 3 has now taken on. The input is terminated at a point in time after t1.

When the input of the message telegram by the control unit 3 is concluded, a signal D1 which corresponds to the diagram of the state value S1 of the terminal 1 is incremented in the control unit 3 from a logic state value "0" to a logic state value "1" (for the sake of simplicity, it is assumed here that a state value transition at the terminal in one direction corresponds to a transition of the signal D1 in the same direction; however, this is not a prerequisite for the implementation of this invention and it will be clear to those skilled in the art that the relationship between the state S1 and the display signal D1 may also be selected to be complementary).

After complete transmission of the message telegram from the terminal 1 to the control unit 3, there follow additional processing steps in the control unit 3. The duration of the processing steps is indicated by the horizontal arrow at the upper level. Only after conclusion of the processing steps does the control unit 3 deliver an acknowledgment signal to sender terminal 1 with which it notifies terminal 1 that the message telegram of the terminal 1 has been successfully entered by the control unit 3. The transmission of the acknowledgment signal also has a certain duration, which is represented by an oblique arrow Q from the upper level to the lower level. The following resting state of the communication between the terminal 1 and the control unit 3 is indicated by a horizontal arrow at the lower level. In this period of time, the terminal 1 processes the message of the control unit 3. Only thereafter can the terminal 1 send a message to the control unit 3 that another transition has taken place. Such a transition has taken place in the example depicted here at the point in time t2, shortly after sending the first message from the terminal 1 to the control unit 3. During the transition at the time t2, the communication took place between the terminal 1 and the control unit 3 and the processing took place in the terminal 1 and/or in the control unit 3. The second state value transition from the logic "1" to the logic "0" was therefore stored temporarily by the terminal 1 and is only now sent to the control unit 3. The display signal D1 is set at "0" and in this case no transition escapes the control unit 3.

Figure 2:
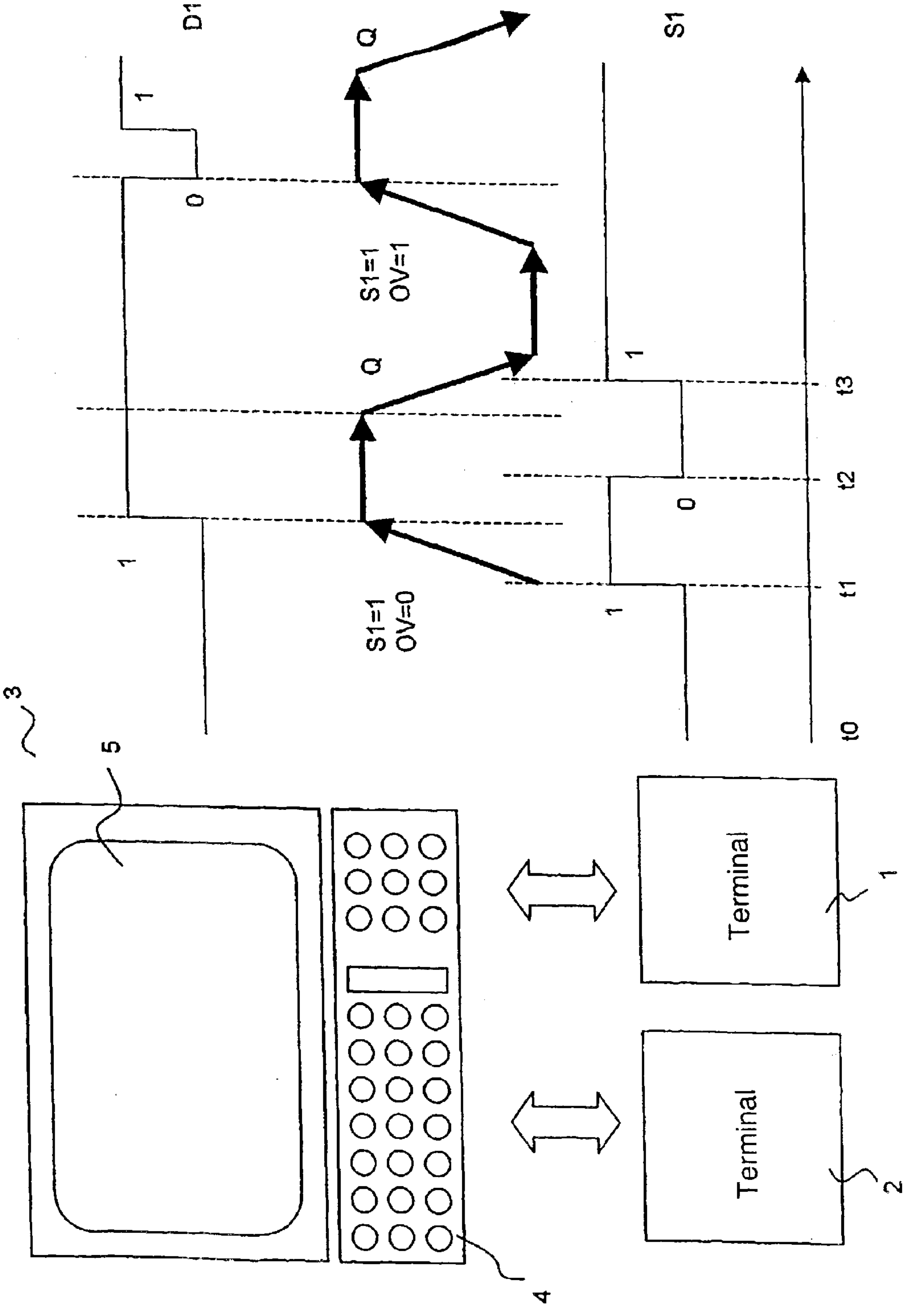
FIG. 2 shows the sequence of the state change and the respective diagram for multiple state transitions, again according to the state of the art.

FIG. 2 shows an expanded message telegram which permits communication between the terminal 1 and the control unit 3 at a higher rate of changes in the state value of the terminal 1. When signals change very rapidly, this may result in a very high message load and greatly restricts the communication capacity of the installation. To prevent this, a method known in the state of the art as "acknowledgment triggered signaling" (ATS) is introduced. Messages can be influenced interactively by this method. A message is sent by the terminal only when this signal has been enabled by the control unit via a telegram. Once a signal has been enabled in the terminal, the terminal sends a signal change and deletes the enablement in the terminal. No other additional signal changes can be sent because of the deleted enable. If a signal is lost, this signal can no longer be enabled. To rule out this self-blockade ("deadlock"), it is absolutely essential for at least the last two signal changes to be detected.

To do so, in the method according to FIG. 2, another component designated as OV ("overflow") is included in the message telegram. In addition to the transitions of the terminal 1 from "0" to "1" at t1 shown in FIG. 1 and from "1" to "0" at t2, there is another transition from "0" to "1" at t3. The transition from "1" to "0" at t2 cannot be sent immediately by the terminal 1 to the control unit 3 for the reasons given above, and it would be lost because, at the point in time when the terminal 1 can send another message to the control unit 3, its state value is (again) "1." The state value "1" of the terminal 1 thus corresponds to the last state value transition reported, and the control unit 3 would not recognize a state value transition of the terminal 1 that is already concluded. However, to also document the transition that is already concluded, in the next message telegram the component OV is set at "1," which indicates to the control unit 3 that, in addition to the transitions reported, a "concealed" transition has also taken place. Therefore, on receipt of the second message telegram which reports the transition from "1" to "0" of the terminal 1, the display signal is therefore set from "1" to "0." However, since the component OV of the message telegram is also set at "1," the display signal D1 is set again immediately at "1" to take into account the "concealed" transition. The resulting display signal D1 is shown at the upper right of FIG. 2.

Figure 3:
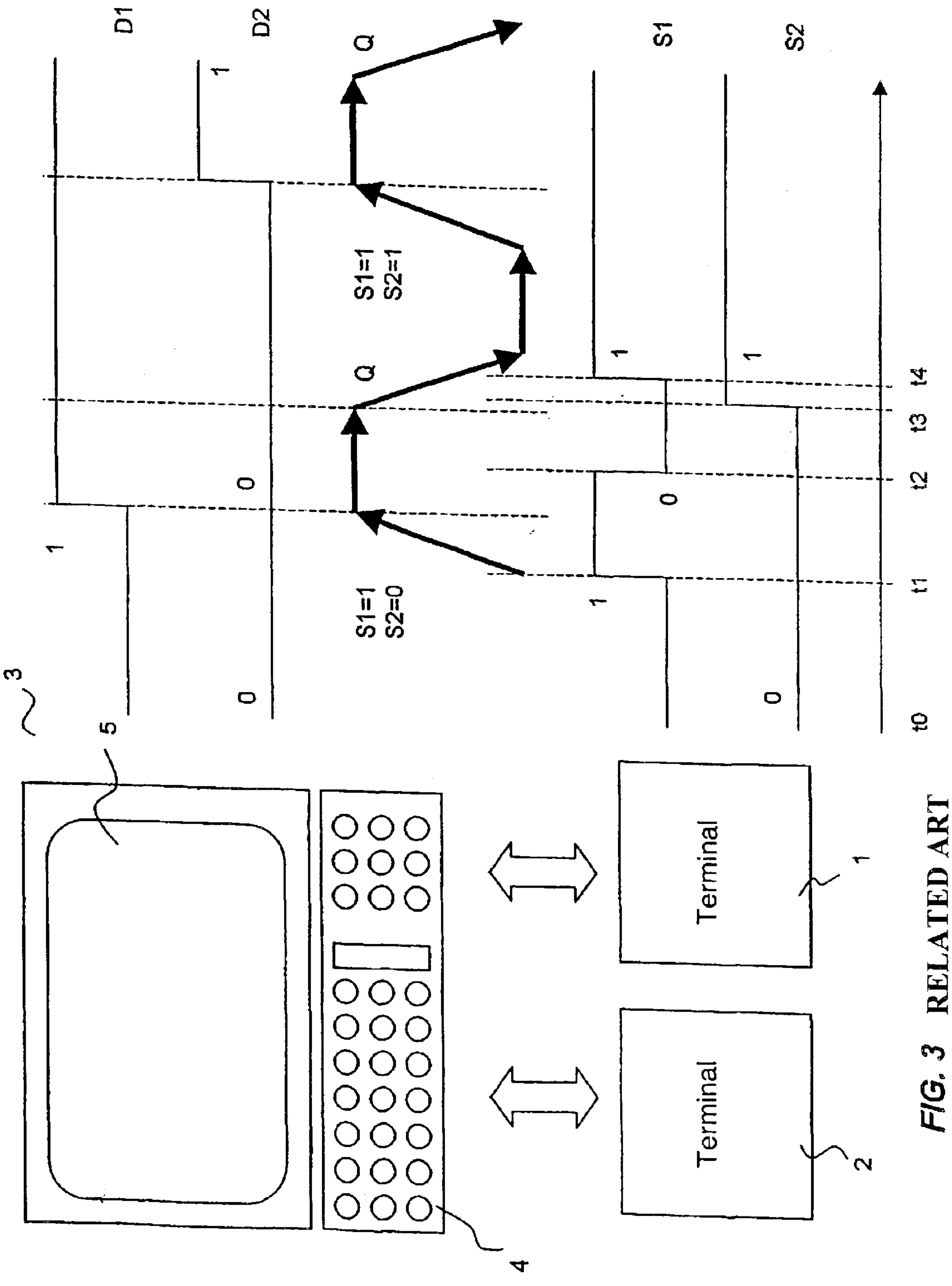
FIG. 3 shows the sequence of the state charge and the respective diagram for multiple message telegrams and multiple state transitions, also according to the state of the art.

As shown in FIG. 3, this information is not sufficient if the terminal 1 can accept several independent states, and therefore more than one state component must be signaled to the control unit 3. FIG. 3 shows an example with a state component S1 and a state component S2 of the message telegram.

In the example in FIG. 3, the same sequence of state value transitions of the state component S1 takes place as in FIG. 2, i.e., there is a first state value transition from "0" to "1" at t1, a second state value transition from "1" to "0" at t2, and a third state value transition from "0" to "1" at t4. In addition, there is a state value transition of a second state component S2 from "0" to "1" at t3 between t2 and t4. The first message telegram sent at t1 from the terminal 1 to the control unit 3 therefore contains as values for the components S1 and S2 "1" and "0." The second message telegram which is sent after t4 by the terminal 1 to the control unit 3 contains as values for the components S1 and S2 "1" and "1" because at this point in time both S1 and S2 have assumed a value of "1." The "concealed" transition of S1 at t2 and t4 is thus lost to the system. This would not change even with an additional component OV of the message telegram because the system would no longer be able to clearly assign this component OV to one of the state values S1 or S2.

Figure 4:
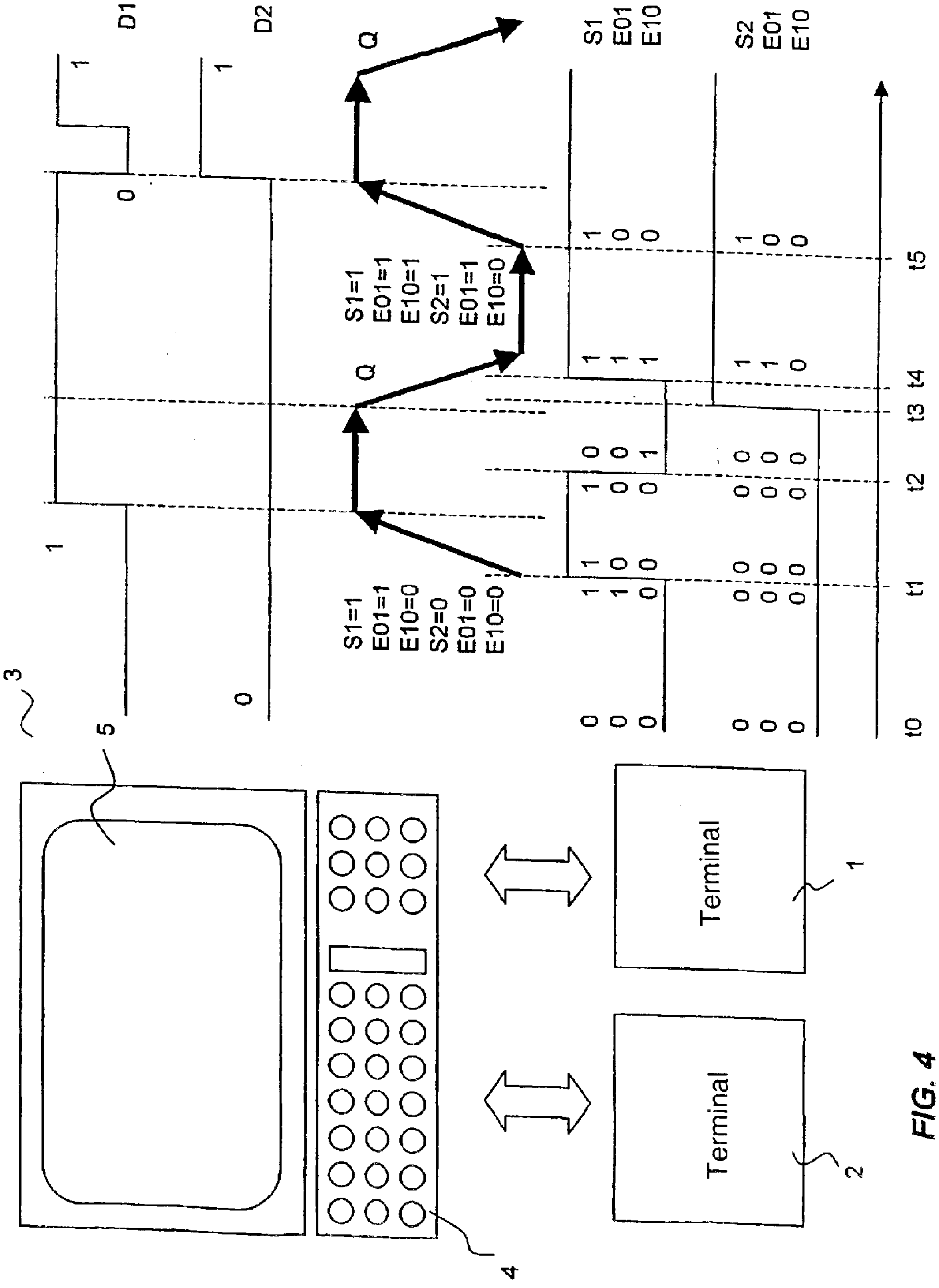
FIG. 4 shows the sequence of the state change and the respective diagram for multiple message telegrams and multiple state transitions, according to the present invention.

FIG. 4 shows an embodiment for reliable detection of state value transitions when there are multiple possible states of the terminal in ATS processes by expanding the message telegram. Under the condition that the control unit has stored the message state, in principle further binary information is necessary for each signal for which a message is sent. If the control unit does not have the message state or if this information is difficult to determine, e.g., in the startup situation of the control unit, then in addition to the particular state component at least two other binary information bits are necessary for every state component. In other words, the message telegram contains at least a first transition component E01 which indicates a transition from a first state value to a second state value and it has a second transition component E10 which indicates a transition from the second state value to the first state value.

In FIG. 4, the additional binary information E01 (state value changes from "0" to "1") and E10 (state value changes from "1" to "0") is assigned to each signal. If there is a state value transition, this is retained in the corresponding result bit E01 or E10 (the components S1, E01, E10, S2, . . . are listed at the lower right in the figure). After sending the message after the point in time t1, this event information is deleted. The following events at t2 and thereafter are collected and signaled with the arrival of the acknowledgment signal Q at the control unit. The control unit can simulate the signal characteristic of the last two signal changes on the basis of the received signal state S1 and the event information E01 and E10.

If other state value transitions also take place after t4, without being able to send a message, then the result information E01 and E10 remains unchanged (the events E01 and E10 have taken place); only the state component S1 assumes the current signal state.

Therefore, the components S1, E01 and E10 of the first state as depicted in FIG. 4 are all at "0" at the point in time t0, like the components S2, E01 and E10 of the second state of the terminal 1. At the point in time t1, the state value of S1 changes from "0" to "1" so that S1 and E01 each assume a value of "1" while all other variables retain the value "0." Immediately after the transition, the value of E01 is again set at "0" because the transition has already been signaled with the last message telegram so that the components S1, E01 and E10 assume a value of "1," "0" and "0" respectively.

The transition of S1 from "1" to "0" occurs at the point in time t2. Consequently, the values of S1, E01 and E10 are "0," "0" and "1," respectively. Since this transition cannot be reported immediately by the terminal 1 to the control unit 3, these values are retained until the point in time t4. At t4 there is another transition of S1 from "0" to "1." The previous transition of S1 has not yet been reported, however, so that S1, E01 and E10 now have a value of "1," "1" and "1," respectively. These values remain in effect until the next message telegram, which is sent to the control unit at time t5 in the example presented here. The values in the message telegram at t5 indicate to the control unit 3 that the current state value S1 is "1" and also that two transitions have occurred since the last message telegram. Therefore the display signal D1 can reconstruct the course of the transitions (qualitative) for the first state of the terminal 1, as depicted at the upper right in FIG. 4, namely by the transitions "0" to "1," "1" to "0" and "0" to "1." This corresponds to the transitions of S1. At t5 the transition components E01 and E10 at S1 are reset at "0."

In the interim, a transition of S2 from "0" to "1" has already taken place at t3. Thus S2 is set at "1" and E01 is also set at "1." These values persist until they are signaled to the control unit in a message telegram. This takes place at the point in time t5. Only thereafter are the transition components E01 and E10 reset to S2 and "0."

In FIG. 4 in addition to the transitions, the values of S1, S2, E01 at S1, E10 at S1, E01 at S2 and E10 at S2 are shown together with the respective values of the other components.

The inventive system can be expanded if the state components S1 and/or S2 of the message telegram display a current state value of the terminal 1 and the control unit 3 compares the current state value of the terminal 1 with a previous state value of the same terminal 1. Depending on the result of the comparison and the particular transition component E01 and/or E10, it is thus possible to determine state transitions of the particular terminal 1 and/or 2 before reaching the current state value.

In some message telegrams according to the state of the art, concomitant information is provided which notifies the control unit of additional information. For example, the concomitant information may include a time information stamp which notifies the control unit of when the state transition was detected at a terminal. In a preferred embodiment of this invention, at least one concomitant information component which ensures the assignment of the corresponding transition components and the respective concomitant value information is also supplied together with such a concomitant value information in the message telegram. For example, the concomitant value information component at Sn is set at "1" when the time information in the concomitant value information is based on a state transition of Sn. If at the same time other state transitions are also recognized in the terminal, other concomitant value information components are also set at "1" accordingly. If the transition from Sn is the only state transition recognized at that point in time and if only one time information is output by the terminal to the control unit, then only one concomitant value information component is set at "1" and all the others remain at "0." Modifications of the expansion of the message telegram by concomitant value information components will be evident to those skilled in the art and therefore will not be explained further here.

This invention is not limited to the above examples. Thus it has been assumed that all the components S1, S2, E01 and E10 of the message telegram are in binary form. However this is not absolutely necessary and instead some or all components may also be, e.g., in the form of analog values.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A method of monitoring an automation system, comprising:

at least one terminal, which is configured to assume at least two state values, outputting a message telegram in accordance with the at least two state values;

a control unit entering the message telegram from the at least one terminal; and the at least one terminal outputting another message telegram only after the one terminal has received an acknowledgment signal (Q) from the control unit;

wherein the message telegram contains at least one first transition component (E01), which indicates a transition from a first state value to a second state value of the at least two state values, and contains at least one second transition component (E10), which indicates a transition from the second state value to the first state value of the at least two state values.

2. The method according to claim 1, wherein the message telegram has at least one state component (S1, S2); and wherein the at least one state component (S1, S2) of the message telegram indicates a current state value of the at least two state values of the terminal;

further comprising the control unit comparing the current state value of the terminal with a preceding state value of the same terminal; and in accordance with the result of the comparison and at least one of the first and the second transition component (E01, E10), determining a state transition of the at least one terminal before the current state value is reached.

3. The method according to claim 1, wherein the message telegram includes concomitant value information; and wherein the message telegram has at least one concomitant value information component which establishes an association between at least one of the transition components and the concomitant value information.

4. The method according to claim 1, wherein all the components (S1, S2, E01, E10) of the at least one message telegram are in binary form.

5. A method for monitoring an automation system, comprising:

outputting a message telegram representing one of at least two state values of a terminal having, variously, at least two state values;

receiving the message telegram; and outputting another message telegram representing one of the at least two state values only after receipt of an acknowledgment signal;

wherein the message telegram contains at least one first transition component, which indicates a transition from a first state value to a second state value of the at least two state values, and contains at least one second transition component, which indicates a transition from the second state value to the first state value of the at least two state values.

* * * * *